(12) United States Patent
Lei et al.

(10) Patent No.: US 12,502,645 B2
(45) Date of Patent: Dec. 23, 2025

(54) CARBON HOLLOW FIBRE MEMBRANE

(71) Applicant: NORWEGIAN UNIVERSITY OF SCIENCE AND TECHNOLOGY (NTNU), Trondheim (NO)

(72) Inventors: Linfeng Lei, Shanghai (CN); Arne Lindbråthen, Tiller (NO); Xuezhong He, Trondheim (NO)

(73) Assignee: NORWEGIAN UNIVERSITY OF SCIENCE AND TECHNOLOGY (NTNU), Trondheim (NO)

( * ) Notice: Subject to any disclaimer, the term of this patent is extended or adjusted under 35 U.S.C. 154(b) by 422 days.

(21) Appl. No.: 18/009,916

(22) PCT Filed: Jun. 9, 2021

(86) PCT No.: PCT/EP2021/065509
§ 371 (c)(1),
(2) Date: Dec. 12, 2022

(87) PCT Pub. No.: WO2021/250119
PCT Pub. Date: Dec. 16, 2021

(65) Prior Publication Data
US 2023/0249136 A1    Aug. 10, 2023

(30) Foreign Application Priority Data

Jun. 12, 2020   (GB) .................................. 2009004

(51) Int. Cl.
*B01D 53/22*   (2006.01)
*B01D 67/00*   (2006.01)
(Continued)

(52) U.S. Cl.
CPC ......... *B01D 71/021* (2013.01); *B01D 53/228* (2013.01); *B01D 67/00165* (2022.08);
(Continued)

(58) Field of Classification Search
CPC ............ B01D 71/021; B01D 67/00165; B01D 53/228; B01D 67/0067; B01D 69/02;
(Continued)

(56) References Cited

U.S. PATENT DOCUMENTS

| | | | | |
|---|---|---|---|---|
| 5,733,657 A | * | 3/1998 | Macheras | ......... B01D 67/00111 264/177.17 |
| 5,760,131 A | * | 6/1998 | Marrocco, III | ............ C08J 5/18 525/437 |

(Continued)

FOREIGN PATENT DOCUMENTS

| | | |
|---|---|---|
| EP | 0459623 A1 | 12/1991 |
| EP | 2199319 A1 | 6/2010 |

(Continued)

OTHER PUBLICATIONS

Falca Gheorghe et al: "Cellulose hollow fibers for organic resistant nanofiltration", Journal of Membrane Science, vol. 586, May 7, 2019.

(Continued)

*Primary Examiner* — Anthony R Shumate
(74) *Attorney, Agent, or Firm* — Meunier Carlin & Curfman LLC

(57) ABSTRACT

The present invention relates to a process for the production of asymmetric cellulose hollow fibres and the use of such fibres in the production of asymmetric carbon hollow fibre membranes (CHFMs). In particular, the present invention provides a facile and scalable process for the preparation of asymmetric CHFMs by direct pyrolysis of polymeric precursors without the need for complex pre-pyrolysis treatment steps to prevent pore collapse. The present invention also relates to the use of asymmetric CHFMs prepared according to said process in the separation of hydrogen gas from a mixed gas source, especially in the separation of (Continued)

hydrogen from $CO_2$ in the steam-methane reforming reaction.

21 Claims, 6 Drawing Sheets

(51) Int. Cl.
*B01D 69/02* (2006.01)
*B01D 69/08* (2006.01)
*B01D 71/02* (2006.01)
*D01D 5/06* (2006.01)
*D01D 5/24* (2006.01)
*D01F 2/02* (2006.01)
*D01F 9/16* (2006.01)

(52) U.S. Cl.
CPC ......... *B01D 67/0067* (2013.01); *B01D 69/02* (2013.01); *B01D 69/08* (2013.01); *B01D 69/087* (2013.01); *D01D 5/06* (2013.01); *D01D 5/24* (2013.01); *D01F 2/02* (2013.01); *D01F 9/16* (2013.01); *B01D 2053/224* (2013.01); *B01D 2256/16* (2013.01); *B01D 2257/504* (2013.01); *B01D 2323/081* (2022.08); *B01D 2325/0231* (2022.08); *B01D 2325/0233* (2022.08); *B01D 2325/20* (2013.01); *D10B 2201/22* (2013.01); *D10B 2505/04* (2013.01)

(58) Field of Classification Search
CPC ................. B01D 69/08; B01D 69/087; B01D 2323/081; B01D 2325/0233; B01D 2325/0231; B01D 2053/224; B01D 2256/16; B01D 2257/504; B01D 2325/20; D01D 5/06; D01D 5/24; D01F 2/02; D01F 9/16; D10B 2201/22; D10B 2505/04
See application file for complete search history.

(56) References Cited

U.S. PATENT DOCUMENTS

| | | | | |
|---|---|---|---|---|
| 8,383,026 | B1* | 2/2013 | Luebke | B01D 67/0011 264/172.16 |
| 9,211,504 | B2 | 12/2015 | Bhuwania et al. | |
| 11,000,812 | B2 | 5/2021 | Takeuchi et al. | |
| 11,007,490 | B2 | 5/2021 | Mabuchi et al. | |
| 2006/0202366 | A1* | 9/2006 | Murakami | B29C 55/023 264/1.7 |
| 2008/0160539 | A1* | 7/2008 | Murphy | B01L 3/5085 435/7.1 |
| 2019/0118133 | A1* | 4/2019 | Chu | B01D 69/145 |
| 2020/0276542 | A1* | 9/2020 | Chu | B01D 69/02 |
| 2023/0372901 | A1* | 11/2023 | Wortman | B01D 71/024 |

FOREIGN PATENT DOCUMENTS

| | | |
|---|---|---|
| JP | H0411933 A | 1/1992 |
| JP | H0472552 B2 | 11/1992 |
| JP | H10305220 A | 11/1998 |
| JP | 2013019065 A | 1/2013 |
| JP | 2016176158 A | 10/2016 |
| WO | 2003/015902 A2 | 2/2003 |
| WO | 2015/048754 A1 | 4/2015 |
| WO | 2018/005924 A1 | 1/2018 |
| WO | 2018187004 A1 | 10/2018 |

OTHER PUBLICATIONS

Linfeng Lei et al: Hollow Fibers Using 1-Ethyl-3-methylimidazolium Acetate-Dimethylsulfoxide Co-Solvent, Polymers, vol. 10, No. 9, Sep. 1, 2018.
Linfeng Lei et al: "Carbon molecular sieve membranes for hydrogen purification from a steam methane reforming process", Journal of Membrane Science, Elsevier BV, NL, vol. 627, Mar. 5, 2021.
International search report and written opinion in PCT/EP2021/065509. Mailed Aug. 25, 2021 (6 pages).
Lei et al., "Screening Cellulose Spinning Parameters for Fabrication of Novel Carbon Hollow Fiber Membranes for Gas Separation", Industrial & Engineering Chemistry Research, Jul. 2, 2019, vol. 58, pp. 13330-13339.
Ma, Yao, et al. "Creation of well-defined "mid-sized" micropores in carbon molecular sieve membranes." Angewandte Chemie International Edition 58.38 (2019): 13259-13265.
Qiu, Wulin, et al. "Hyperaging tuning of a carbon molecular-sieve hollow fiber membrane with extraordinary gas-separation performance and stability." Angewandte Chemie International Edition 58.34 (2019): 11700-11703.
Bhuwania, Nitesh, et al. "Engineering substructure morphology of asymmetric carbon molecular sieve hollow fiber membranes." Carbon 76 (2014): 417-434.
Zhiming, Mao, et al. "Effect of Coagulation Bath Temperature on Structure and Gas Separation Properties of Cellulose Hollow Fiber Membranes." Acta Polymerica Sinica 4 (2011): 395-401. Abstract.
Chou, Wen-Li, and Ming-Chien Yang. "Effect of coagulant temperature and composition on surface morphology and mass transfer properties of cellulose acetate hollow fiber membranes." Polymers for advanced technologies 16.7 (2005): 524-532.
Sanmugam, Sathiya, Norlisa Harruddin, and Syed M. Saufi. "Effect of coagulation bath temperature during preparation of PES hollow fiber supported liquid membrane for acetic acid removal." Chemical Engineering Research Bulletin (2017): 118-122.

* cited by examiner

CARBON HOLLOW FIBRE MEMBRANE

The present invention relates to a process for the production of asymmetric cellulose hollow fibres and the use of such fibres in the production of asymmetric carbon hollow fibre membranes (CHFMs). In particular, the present invention provides a facile and scalable process for the preparation of asymmetric CHFMs by direct pyrolysis of polymeric precursors without the need for complex pre-pyrolysis treatment steps to prevent pore collapse. The present invention also relates to the use of asymmetric CHFMs prepared according to said process in the separation of hydrogen gas from a mixed gas source, especially in the separation of hydrogen from $CO_2$ in the steam-methane reforming reaction.

BACKGROUND

Hydrogen, as a clean and efficient energy carrier, is also a diverse feedstock used for producing a wide range of products such as petrochemicals, semiconductors, ammonia, methanol, and vitamins. Hydrogen production from natural gas is considered as one of the most promising and large-scale technologies for the implementation of the hydrogen economy, with respect to a low-carbon energy future and the reduction of greenhouse gas emissions.

In comparison with conventional hydrogen purification technologies such as pressure swing adsorption (PSA) and fractional/cryogenic distillation, membrane-based separation technology is currently considered as a promising alternative owing to its lower investment cost, intrinsic higher energy efficiency and environmental friendliness. Various membrane materials such as polymeric membranes, inorganic-based membranes like graphene oxide (GO), $MoS_2$, zeolite imidazolate framework (ZIF), and metal-organic frameworks (MOFs) have been developed for $H_2/CO_2$ separation. However, achieving some commercially viable membranes for $H_2$ purification is still challenging, either due to a low separation performance, or complex preparation processes (high cost) or limited stability under adverse conditions (e.g. high temperature and pressure in the steam methane reforming process).

Carbon molecular sieve (CMS) membranes have rigid pore structures and are fabricated by controlled carbonisation of porous polymeric precursors at high temperature. CMS are thus promising candidates as temperature- and pressure-resistant materials when fabricated into hollow fibres suitable for membrane modules. The bimodal pore structure of CMS membranes, comprised of small ultramicropores and larger micropores, provides favourable gas selectivity in $H_2$-related separations such as $H_2/CH_4$ and $H_2/C_2H_4$. However, due to the strong adsorption between the carbon surface and $CO_2$ molecules, relatively low $H_2/CO_2$ selectivities have been reported to date.

Recently, Ma et al. (*Angew. Chem. Int. Ed.* 58, 13259-13265 (2019)) reported a $H_2$-assisted method to create "mid-sized" ultramicropores (5-7 Å) in CMS membranes by introducing $H_2$ into the carbonization environment. The introduction of $H_2$ during the carbonization process was found to inhibit aromatization during thermal decomposition of the polymer network, resulting in a structure with wider ultramicropores compared with the CMS membranes made using argon atmosphere. Introducing an additional thermal treatment step for the freshly-prepared CMS membranes at a temperature range of 90-250° C., referred to as "hyperaging treatment" to accelerate aging, was shown to create smaller ultramicropores as reported by Qiu et al. (*Angew. Chem. Int. Ed.* 58, 11700-11703 (2019)). However, the CMS membranes reported so far still present relatively larger ultramicropores, which does not allow precise gas sieving between $H_2$ and $CO_2$.

Another problem often encountered with the production of CMS membranes is pore collapse. Many polymeric precursors commonly used in the manufacture of CMS membranes exhibit pore collapse during carbonisation, leading to densification of the resulting membrane. This densification is often detrimental to the performance of the membrane in gas separation applications, particular with respect to the permeance of the membrane. In addition, pore collapse can result in the destruction of any asymmetry present in the polymeric precursor fibre, leading to a CMS membrane which is symmetric and unsuitable for gas separation applications.

Several authors have attempted to address the problem of pore collapse. Bhuwania et al. (*Carbon* 76, 417-434 (2014), U.S. Pat. No. 9,211,504B2) demonstrate a method by which to reduce pore collapse during pyrolysis and thus preserve the asymmetric structure of polymeric precursors. The method (referred to as a "V-treatment") involves contacting the polymeric precursors with a silicon-containing compound such as vinyltrimethylsilane (VTMS) before pyrolysis, thereby forming a "cross-linked" network within the precursor structure which prevents pore collapse.

Whilst such methods are effective in preventing pore collapse however, the use of additional treatment steps is costly and increases the complexity of the overall process. In addition, the use of potentially toxic silicon-containing compounds is undesirable and also results in a significant amount of residual silicon in the CHFM, which may lead to a reduction in performance of the membrane.

There is thus a need for a new process for the production of asymmetric CHFMs which solves these problems. In particular, there is a need for a process for the production of asymmetric CHFMs which does not require complex pre-pyrolysis treatment steps in order to avoid pore collapse and which leads to a CHFM suitable for use in the separation of hydrogen gas from a mixed gas stream. In addition, there is a need for such a CHFM to have the good high pressure and temperature stability required by applications such as the separation of hydrogen gas from $CO_2$ in the steam-methane reforming reaction. It is also desirable for such a CHFM production process which allows easy tunability of pore morphology i.e. the relative proportion of micro- and ultra-micropores.

The present inventors have now established that an asymmetric CHFM may be produced without the need for complex pre-pyrolysis treatment steps in order to avoid pore collapse by use of an asymmetric cellulose hollow fibre as a polymeric precursor. The inventors have established that a suitable asymmetric cellulose hollow fibre may be formed by a dry-wet spinning process involving careful control of the coagulation bath temperature. The process for the production of a suitable asymmetric cellulose hollow fibre thus forms an additional aspect of the invention.

The resulting asymmetric CHFM has been demonstrated to have good permeance and selectivity for hydrogen over larger gas molecules such as $CO_2$, as well as high stability under conditions of high pressure and temperature. The CHFM produced according to the processes disclosed herein is thus particularly suitable for use in the separation of hydrogen gas in the steam-methane reforming reaction. The process for the production of CHFMs provided by the present inventors also provides easy tunability of the pore morphology of the membrane (and therefore the relative permeance/selectivity) by variation of the pyrolysis temperature.

SUMMARY OF THE INVENTION

In one aspect, the invention relates to a process for the production of an asymmetric cellulose hollow fibre comprising the steps of:
  a) providing a dope solution comprising cellulose, at least one ionic liquid, and optionally one or more co-solvent (s);
  b) coextruding said dope solution and a bore fluid comprising water, at least one ionic liquid, and optionally one or more co-solvent(s), into a gaseous atmosphere;
  c) quenching the coextruded dope solution and bore fluid in at least one coagulation bath comprising water to form a water-wetted fibre, wherein the temperature of the coagulation bath is greater than 40° C.;
  d) contacting said water-wetted fibre with at least one organic solvent having a surface tension lower than that of water; and optionally
  e) drying the fibre.

In a further aspect, the invention relates to an asymmetric cellulose hollow fibre produced according to such a process. In particular, the asymmetric cellulose hollow fibre has a dense outer layer and a porous inner layer.

In another aspect, the invention relates to a process for the production of an asymmetric carbon hollow fibre membrane (CHFM) comprising the steps of:
  a) providing an asymmetric cellulose hollow fibre; and
  b) pyrolysing said asymmetric cellulose hollow fibre; and optionally
  c) assembling a module comprising a plurality of said asymmetric cellulose hollow fibres.

In a preferred embodiment, the step a) of providing an asymmetric cellulose hollow fibre comprises the step of performing a process for the production of an asymmetric cellulose hollow fibre according to the first aspect of the invention.

In a further aspect, the invention relates to an asymmetric carbon hollow fibre membrane produced by any of the processes described herein.

In a further aspect, the asymmetric carbon hollow fibre membrane has a dense outer layer and a porous inner layer.

In a still further aspect, the invention relates to the use of such an asymmetric carbon hollow fibre membrane in the separation of hydrogen gas from a mixed gas stream, such as in the separation of $H_2$ from $CO_2$ in the steam-methane reforming reaction.

DETAILED DESCRIPTION OF THE INVENTION

The present invention relates to processes for the production of asymmetric cellulose hollow fibres and the use of such fibres in the production of asymmetric carbon hollow fibre membranes (CHFMs).

As used herein, the term "asymmetric" refers to the cross-sectional structure of cellulose hollow fibres and CHFMs, characterised by the presence of at least two concentric layers in the fibre having different levels of porosity. For instance, in one embodiment the asymmetric cellulose hollow fibres or CHFMs have at least a relatively less porous or "dense" outer layer and a more relatively more porous "porous" inner layer. This is in contrast to "symmetric" hollow fibres which exhibit no particular layer structure characterised by variations in porosity.

In general, and especially in gas separation applications, the dense outer layer functions as the selective layer, allowing certain species to cross the membrane whilst blocking other larger species. The porous layer on the other hand acts primarily as a support for the dense outer layer and provides a mechanism by which species may be transported to the dense layer.

Preparation of Asymmetric Cellulose Hollow Fibres

The asymmetric cellulose hollow fibres disclosed herein are produced by a dry-wet spinning process. A schematic of an example of the process is shown in FIG. 1A). The individual steps leading up to the production of the asymmetric cellulose hollow fibres are described in detail below.

Step a)—Provision of Dope Solution

In a first step of the process for the production of an asymmetric cellulose hollow fibre according to the present invention, a dope solution is provided. The dope solution comprises cellulose, at least one ionic liquid and optionally one or more co-solvent(s). The cellulose used can derive from any plant source such as wood pulp, or cotton pulp. It is typically a powder. In a preferred embodiment, the cellulose used is "unmodified", i.e. it is not a derivative of cellulose such as a cellulose ester or cellulose ether.

In one embodiment therefore, the dope solution comprises less than 5 wt. % of any derivative of cellulose such as cellulose acetate, cellulose triacetate, cellulose propionate, methyl cellulose or carboxymethyl cellulose. In a preferred embodiment, the dope solution is free of any derivative of cellulose. In a particularly preferred embodiment, the cellulose added to the dope solution is microcrystalline cellulose (MCC).

Typically, the amount of cellulose dissolved in the dope solution is anywhere between 1.0 and 25.0 wt. %. In one embodiment, the amount of cellulose in the dope solution is greater than 5.0 wt. %, such as 5.0 to 25.0 wt. %, more preferably 5.0 to 20.0 wt. %; such as 5.0 to 15.0 wt. %. In a particularly preferred embodiment, 10.0 to 15.0 wt. % of cellulose is dissolved in the dope solution.

In addition to cellulose, the dope solution comprises an ionic liquid. An ionic liquid is a salt which is a liquid at 25° C. and atmospheric pressure. Room-temperature ionic liquids comprise bulky and asymmetric organic cations often based on heterocycles such as 1-alkyl-3-methylimidazolium, 1-alkylpyridinium, fluorosulfonyl-trifluoromethanesulfonylimide (FTFSI) N-methyl-N-alkylpyrrolidinium and ammonium ions. Phosphonium cations are also possible. A wider range of anions are employed, ranging from simple halides to inorganic anions such as tetrafluoroborate and hexafluorophosphate, and to small or large organic anions like bistriflimide, acetate, cyanamide, triflate or tosylate.

Suitable ionic liquids include [Emim][OAc], [Emim][Cl], [Emim][dicyanamide], [Emim][DEP], [Emim][DMP] and 1-butyl-3,5-dimethylpyridinium bromide. In a particular embodiment, the ionic liquid comprises the cation 1-Ethyl-3-methylimidazolium ([Emim]) or 1-butyl-3-methylimidazolium. 1-Ethyl-3-methylimidazolium acetate ([Emim][OAc]) is particularly preferred. Typically, the ionic liquid has a melting point in the range 25 to 100° C.

Generally, the amount of ionic liquid in the dope solution should be sufficient to dissolve the cellulose component. In one embodiment, the ionic liquid forms at least 25 wt. % of the dope solution, preferably at least 50 wt. %, more preferably at least 60 wt. %, such as at least 75 wt. %. In one embodiment the ionic liquid forms less than 95 wt. % of the dope solution, such as less than 90 wt. %.

Optionally, the dope solution comprises one or more co-solvent(s) in addition to the ionic liquid. The use of a co-solvent may increase the ionic strength of the ionic liquid, thereby increasing the solubility of the cellulose component in the dope solution. In one embodiment, the co-solvent is a polar solvent, preferably an aprotic polar solvent such as dimethylformamide (DMF), 1,3-dimethyl-2-imidazolidinone (DMI), dimethylsulfoxide (DMSO) or mixtures thereof. DMSO is particularly preferred. A particularly preferred combination of ionic liquid and co-solvent is a mixture of [Emim][OAc] and DMSO.

When present, the amount of the co-solvent in the dope solution is typically in the range of 10.0 wt. % to 90.0 wt. %. In a preferred embodiment, the co-solvent is present in an amount of 10.0 to 70.0 wt. %, more preferably 10.0 to 50.0 wt. %, such as 15.0 to 30 wt. %. In one embodiment, the weight ratio of the amount of ionic liquid to co-solvent is in the range 1:10 to 10:1, preferably 1:3 to 5:1, more preferably 2:1 to 5:1. In a particularly preferred embodiment, the dope solution comprises [Emim][OAc] and DMSO in a weight ratio of about 3:1.

Step b)—Co-Extrusion with Bore Fluid

In a second step of the process for the production of an asymmetric cellulose hollow fibre according to the present invention, the dope solution provided in step a) is co-extruded with a bore fluid into a gaseous atmosphere. The co-extrusion step is also known as the "spinning" step and involves surrounding the bore fluid with the dope solution and co-extruding through a spinneret into a gaseous atmosphere, usually air. This is commonly referred to as the "dry" phase of the dry-wet spinning process.

The gap between the spinneret die and the water bath is often called the air gap and the size of this air gap can be changed. Typically air gaps are 0.5 to 25 cm, such as 5 to 15 cm. Larger air gaps generally give a stronger stretch to nascent fibres and thus a more ordered cellulose chain orientation.

The bore fluid comprises water, at least one ionic liquid and optionally one or more co-solvents(s). The types of ionic liquid and co-solvents described herein as being suitable for use in the dope solution are equally suitable for use in the bore fluid. The ionic liquid and optional co-solvent components in the bore fluid may be the same or different to the ionic liquid and optional co-solvent present in the dope solution.

In a preferred embodiment, the ionic liquid and co-solvent (if present) in the bore fluid are the same as those used in the dope solution. In a preferred embodiment, the bore fluid comprises an ionic liquid comprising the Emim cation, such as [Emim][OAc]. The co-solvent (if present) is preferably a polar solvent, more preferably an aprotic polar solvent such as DMSO.

The amount of water in the bore fluid is typically in the range of 5 to 50 wt. %, preferably 5 to 30 wt. %, more preferably 10 to 30 wt. %, such as 10 to 25 wt. %. In order to obtain a cellulose hollow fibre having an asymmetric structure, it is necessary for the composition of the bore fluid to be different to the dope solution. It is therefore preferable that the amount of water in the bore fluid is different (preferably larger) than the amount (if any) present in the dope solution. In one embodiment, the non-solvent water forms at least 10 wt. % of the bore fluid, preferably at least 15 wt. %

In one embodiment, the ionic liquid forms at least 10 wt %, such as at least 50 wt. % of the bore fluid, preferably at least 60 wt. %. In one embodiment the ionic liquid forms less than 95 wt. % of the bore fluid, such as less than 90 wt. %. The amount of the co-solvent in the bore fluid is typically in the range of 1.0 to 90.0 wt. %, such as 10 to 25 wt %. In one embodiment, the weight ratio of the amount of ionic liquid to co-solvent is in the range 1:3 to 10:1, preferably 2:1 to 5:1. In a particularly preferred embodiment, the bore fluid comprises [Emim][OAc] and DMSO in a weight ratio of about 3:1.

The temperature of the dope solution and bore fluid during the co-extrusion step may be the same or different, and is preferably in the range of 5 to 80° C., preferably 15 to 70° C., such as 20 to 60° C. A temperature of 20 to 40° C. of the dope solution and bore fluid is particularly preferred.

Step c)—Quenching

After the dope solution and bore fluid have been co-extruded and contacted with the gaseous atmosphere, they are quenched in at least one coagulation bath. The coagulation bath causes phase separation to occur within the co-extruded dope solution and bore fluid, thus leading to the formation of water-wetted cellulose hollow fibres.

The coagulation bath contains water, either in the form of a mixture with one or more other solvents, or alone. In a preferred embodiment, the coagulation bath contains only water.

The present inventors have established that the temperature of the coagulation bath is critical in preparing cellulose hollow fibres having an asymmetric structure. Specifically, the inventors have established that when the co-extruded dope solution and bore fluid are quenched in a coagulation bath having a coagulation bath temperature of 40° C. or less, the resulting cellulose hollow fibres exhibit a dense symmetric structure (see Example 2 and FIG. 4).

Thus, in order to obtain cellulose hollow fibres having an asymmetric structure, a coagulation bath temperature of greater than 40° C. is required, preferably greater than 41° C., such as greater than 45° C. The coagulation bath temperature may also be as high as 80° C., such as 41 to 80° C., preferably 41 to 70° C. In a particularly preferred embodiment, the coagulation bath temperature is 45° C. or more, such as in the range 45 to 80° C., preferably 45 to 70° C., especially 45 to 65° C.

In one embodiment, the coextruded dope solution and bore fluid are passed through more than one coagulation bath. In this case, the requirement that the coagulation bath temperature be greater than 40° C. applies only to the first coagulation bath in the series. The second or later coagulation bath(s) may have a temperature in the range of 10 to 80° C., preferably 20 to 70° C., such as 25 to 60° C. Where present, the second or later coagulation bath preferably has the same composition as the first coagulation bath. In a particularly preferred embodiment, two coagulation baths containing water are used in series, where the temperature of the first bath is higher than that of the second bath.

Steps d) and e)—Solvent Exchange and Drying

After quenching, the water-wetted fibres are subjected to a solvent exchange process in order to remove the water from the fibres. If such a process is omitted and the water-wetted fibres are dried directly, the high capillary forces can cause the pore structure of the hollow fibre to collapse (see FIG. 3). Thus in order to prevent pore collapse, the water-wetted fibres produced in step c) are contacted with at least one organic solvent having a surface tension lower than that of the water in the fibres. The organic solvent must have a surface tension lower than that of water in order to reduce the capillary forces exerted by the fluid present in the pores of the fibre. By replacing the water in the fibres with a solvent having a lower surface tension, capillary forces are reduced and pore collapse on drying is reduced.

In one embodiment, the fibres are washed with water to remove any residual ionic liquid or bore fluid. Whether or not this washing step is effected, the water-wetted fibres are then contacted with at least one organic solvent having a surface tension lower than that of the water. In one embodiment, the organic solvent is selected from the group consisting of C1-C6 alcohols, C5-C8 linear or branched aliphatic hydrocarbons, or mixtures thereof. In a preferred embodiment, the organic solvent is selected from isopropanol, n-hexane, or a mixture thereof.

In a particularly preferred embodiment, the water-wetted fibres are contacted sequentially with at least two different organic solvents. For example, in one embodiment the fibres are first contacted with a C1-C6 alcoholic solvent, such as isopropanol, followed by a second contacting step with a solvent selected from the group of C5-C8 linear or branched aliphatic hydrocarbons, such as n-hexane. When more than one contacting step is used, it is especially preferred that the second or subsequent solvent has a lower surface tension than the solvent used in the previous step. In this way, the surface tension of the fluid in the pores of the fibre is gradually reduced until it is possible to dry the fibre without pore collapse.

Once the solvent exchange process has taken place, the fibres are dried. Typically the fibres are dried at room temperature in air, however any conventional drying method may be used.

The resulting dried cellulose hollow fibres have an asymmetric structure, with at least a thin dense outer layer and a more porous supporting inner layer. SEM images of a cellulose hollow fibre produced according to the process of the present invention are shown in FIG. 2. The diameter of the fibre is typically in the range of 300-800 µm, preferably 400-600 µm. The thickness of the fibre wall (i.e. measured from the inside wall of the fibre to the outside wall) is typically in the range 25-200 µm, preferably 50-100 µm. The thickness of the dense outer layer is typically less than 50 µm, such as less than 25 µm, preferably less than 10 µm.

Viewed from another aspect the invention provides an asymmetric cellulose hollow fibre having a dense outer layer and a concentric porous inner layer wherein said dense outer layer is substantially free of macrovoids larger than 500 nm and said inner porous layer comprises a plurality of pores having a largest pore diameter of at least 500 nm.

Viewed from another aspect the invention provides an asymmetric cellulose hollow fibre having a dense outer layer of thickness less than 10 µm and a concentric porous inner layer of thickness 25 to 100 µm wherein said dense outer layer is substantially free of macrovoids larger than 500 nm and said inner porous layer comprises a plurality of pores having a largest diameter of at least 500 nm.

Viewed from another aspect the invention provides an asymmetric cellulose hollow fibre having a dense outer layer of thickness less than 10 µm and a concentric porous inner layer of thickness 25 to 100 µm.

Typically, the asymmetric cellulose hollow fibre prepared by the methods described herein consists primarily of cellulose II, whereas the cellulose component in the dope solution is typically cellulose I. In one embodiment, the asymmetric cellulose hollow fibre consists essentially of (i.e. at least 95 wt. %, such as at least 99 wt. %) of cellulose II. The asymmetric cellulose hollow fibre is typically substantially free of cellulose acetate monomers (e.g. less than 5 wt. %, such as less than 1 wt. %).

Preparation of Asymmetric Carbon Hollow Fibre Membranes (CHFMs)

In one aspect, the present invention relates to a process for the production of an asymmetric carbon hollow fibre membrane (CHFM) comprising the steps of:
a) providing an asymmetric cellulose hollow fibre; and
b) pyrolysing said asymmetric cellulose hollow fibre.

The pyrolysis step is also commonly referred to as "carbonisation" and is generally conducted either under vacuum or in an inert gas environment, such as $CO_2$, $N_2$, Ar and He.

In a particularly preferred embodiment, the step a) of providing an asymmetric cellulose hollow fibre comprises the step of performing a process for the production of an asymmetric cellulose hollow fibre as described herein. In one aspect therefore, the invention provides a process for the production of an asymmetric CHFM comprising the steps of:
a) providing a dope solution comprising cellulose, at least one ionic liquid, and optionally one or more co-solvent(s);
b) coextruding said dope solution and a bore fluid comprising water, at least one ionic liquid, and optionally one or more co-solvent(s), into a gaseous atmosphere;
c) quenching the coextruded dope solution and bore fluid in at least one coagulation bath comprising water to form a water-wetted fibre, wherein the temperature of the coagulation bath is greater than 40° C.;
d) contacting said water-wetted fibre with at least one organic solvent having a surface tension lower than that of water;
e) drying the fibre to form an asymmetric cellulose hollow fibre; and
f) pyrolysing said asymmetric cellulose hollow fibre.

FIG. 5 outlines the basic steps of the carbonization mechanism of CHFMs. In general, during the carbonization process the physical desorption of free water below 150° C. occurs first, followed by dehydration (150-200° C.) to remove bound water. The cleavage of the 1,6-glycosidic linkages occurs at above 200-250° C., where cellulose depolymerization forms levoglucosan (b). Carbon plates (c) formed by the chain scission of cellulose by cleavage of 1,6-glycosidic linkages and subsequent polymerization by intermolecular rearrangement at 250-300° C., lead to the formation of a less-ordered microstructure "carbon cell" with micropores and ultramicropores (d). Generally the heating rate in the temperature range of 250-300° C. is at most 4° C. $min^{-1}$. These micropores can be further narrowed through internal condensation at higher carbonization temperatures (e.g., >600° C.) (e). Finally, carbon membranes (f) with bimodal pore structures containing both micropores and ultramicropores are obtained.

During the pyrolysis process, the cellulose hollow fibres are preferably heated to a temperature of at least 500° C., such as 500-900° C., preferably at least 600° C., more preferably at least 800° C.

In general, it is observed that an increase in pyrolysis temperature correlates with an increase in selectivity for smaller gases such as hydrogen, but also a slight decrease in permeance. Without wishing to be bound by theory, it is believed that the observed variation in performance between the CHFMs prepared at high carbonisation temperatures and those prepared at low carbonisation temperatures is the result of the relative proportion in the number of ultramicropores and (larger) micropores. The ultramicropores are the slits or the smaller spaces between highly aromatic strands of carbon. The ultramicropores govern the gas pair selectivity, while the micropores, formed by voids between aromatic carbon plates, contribute to high gas permeance. The CHFMs tend to form more ordered graphitic carbon structures ($sp^2$ hybridized carbon) with increasing carbonization temperature, which is beneficial to the packing of the carbon strands and induces the formation of narrower ultra-micropores. On the other hand, the micropores existing between the aromatic carbon plates are more prone to compaction, due to the reduced content of three dimensional $sp^3$-hybridized carbon. The ability to control the pyrolysis temperature in the process therefore allows for control over the gas separation performance of the resulting CHFM.

FIGS. 7A-B shows the structure of a CHFM produced according to the process of the present invention. The fibres exhibit a clear asymmetric structure, having a dense outer layer and a porous inner support layer without any substantial pore collapse. In one embodiment, the thickness of the dense layer is less than 20 µm, such as less than 10 µm, most preferably less than 5 µm.

The pores in the inner layer can be regarded as macropores as they generally allow the gases being separated to pass through without a separation process. Hence the porous inner layer does not separate gases in the gas mixture supplied to the CHFM. The dense layer is typically free of macropores that is larger than 50 nm, however it may contain micropores and ultramicropores which enable separation of the target gases. Suitable pore sizes are 2.0 to 8.0 Angstroms.

Viewed from another aspect the invention provides an asymmetric carbon hollow fibre membrane having a dense outer layer and a concentric porous inner layer wherein said dense outer layer is substantially free of pores larger than 8.0 Å.

Viewed from another aspect the invention provides an asymmetric carbon hollow fibre membrane having a dense outer layer of thickness less than 10 µm and a concentric porous inner layer of thickness 25 to 100 µm wherein said dense outer layer is substantially free of pores larger than 8.0 Å and said inner porous layer comprises a plurality of macropores.

Viewed from another aspect the invention provides an asymmetric cellulose hollow fibre membrane having a dense outer layer of thickness less than 10 µm and a concentric porous inner layer of thickness 25 to 100 µm.

Surprisingly, the present inventors have now established that by using an asymmetric cellulose hollow fibre as a polymeric precursor, asymmetric CHFMs may be prepared without the need for additional pre-pyrolysis treatment steps to prevent pore collapse. Such treatments are often complex and costly, and so by eliminating the need to perform such steps, the present invention provides a simpler and cheaper method for the fabrication of CHFMs.

One example of a pre-treatment that has been used to prevent pore collapse during carbonisation is the "V-treatment" proposed by Bhuwania et al. (*Carbon* 76, 417-434 (2014), U.S. Pat. No. 9,211,504B2), which involves contacting the polymeric precursor fibre with a silicon-containing compound. This however results in a significant amount of residual silicon in the CHFM, which may lead to a reduction in performance of the membrane.

In one embodiment therefore, the CHFM according to the present invention comprises less than 1.0 at. %, such as less than 0.5 at. %, preferably less than 0.1 at. %, most preferably less than 0.05 at. % of silicon, as measured by X-ray photoelectron spectroscopy (XPS). In another embodiment, the CHFM comprises greater than 95 at. % of the elements carbon, oxygen and nitrogen. In one aspect, the CHFM consists essentially (i.e. greater than 99 at. %) of these elements.

The CHFMs of the invention may comprise at least 85 at. % C, 5 to 15 at. % O and up to 1.0 at. % N.

The CHFMs produced according to the process of the present invention exhibit good flexibility. In one embodiment, the CHFMs may have a bend radius of less than 1.5 cm, such as less than 1 cm. In some embodiments, the CHFMs can have a bend radius as low as 0.5 cm.

Applications

The CHFMs produced according to the present invention are particularly suitable for use in gas separation applications. In one aspect therefore, the present invention provides the use of an asymmetric carbon hollow fibre membrane (CHFM) prepared by a process as described herein in the separation of hydrogen gas from a mixed gas stream, such as in the separation of $H_2$ from $CO_2$ in the steam-methane reforming reaction. In one embodiment, the CHFM according to the present invention has an $H_2$ permeance of at least 140 GPU and an $H_2/CO_2$ selectivity of at least 10.0, preferably at least 45.0, such as at least 80.0.

It may be that a plurality of carbon hollow fibres are combined to form a module. Herein a single carbon hollow fibre is considered to be a membrane. The invention also however relates to the combination of a plurality of CHFMs to make a module.

The present invention will now be further described with reference to the following examples and figures.

A key step is the fabrication of asymmetric cellulose hollow fibers by controlling the coagulation temperature at >40° C. (60° C. was used in the examples). Step 2 is the non-solvent exchange using lower surface tension solvents such as isopropanol, n-hexane to remove residual water inside hollow fibers before drying to prevent pore morphology collapse. Step 3 is tuning the ultramicropore and micropore structure of carbon membranes by changing the final carbonization temperature from 550-850° C.

Figure 2:
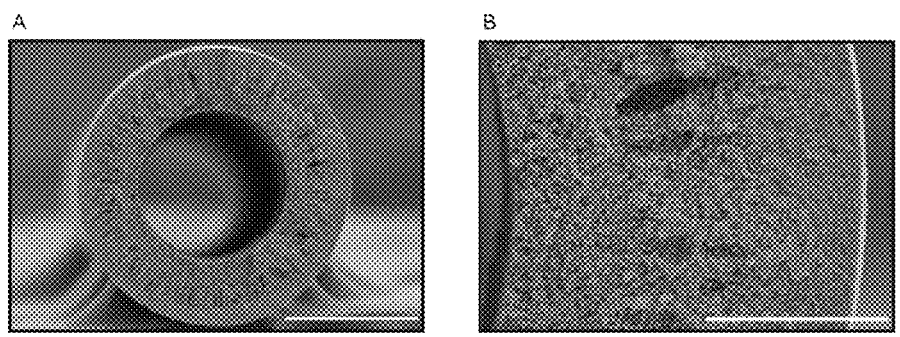

FIG. 2. A+B) Cross-sectional SEM images of a cellulose hollow fibre precursor dried after anti-collapse treatment. Scale bars: A-200 µm, B-50 µm.

Figure 3:
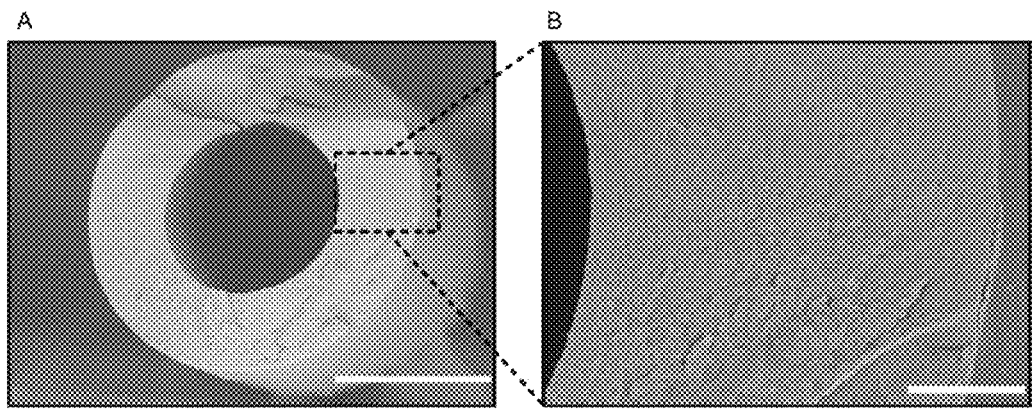

FIG. 3. A+B) Cross-sectional SEM images of a cellulose hollow fibre carbon membrane precursor with ambient air drying, directly from water-wetted membranes. Scale bars: A-200 µm, B-30 µm.

Figure 4:
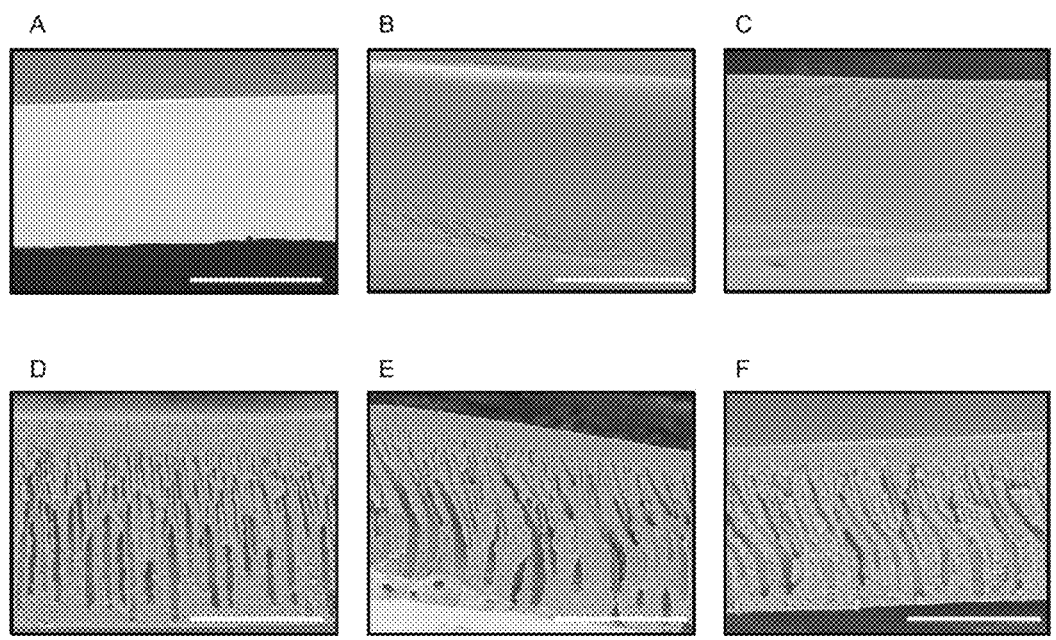

FIG. 4. Comparative cross-sectional SEM images of flat sheet membranes cast at various coagulation bath temperatures. Scale bars: 100 µm.

Figure 5:
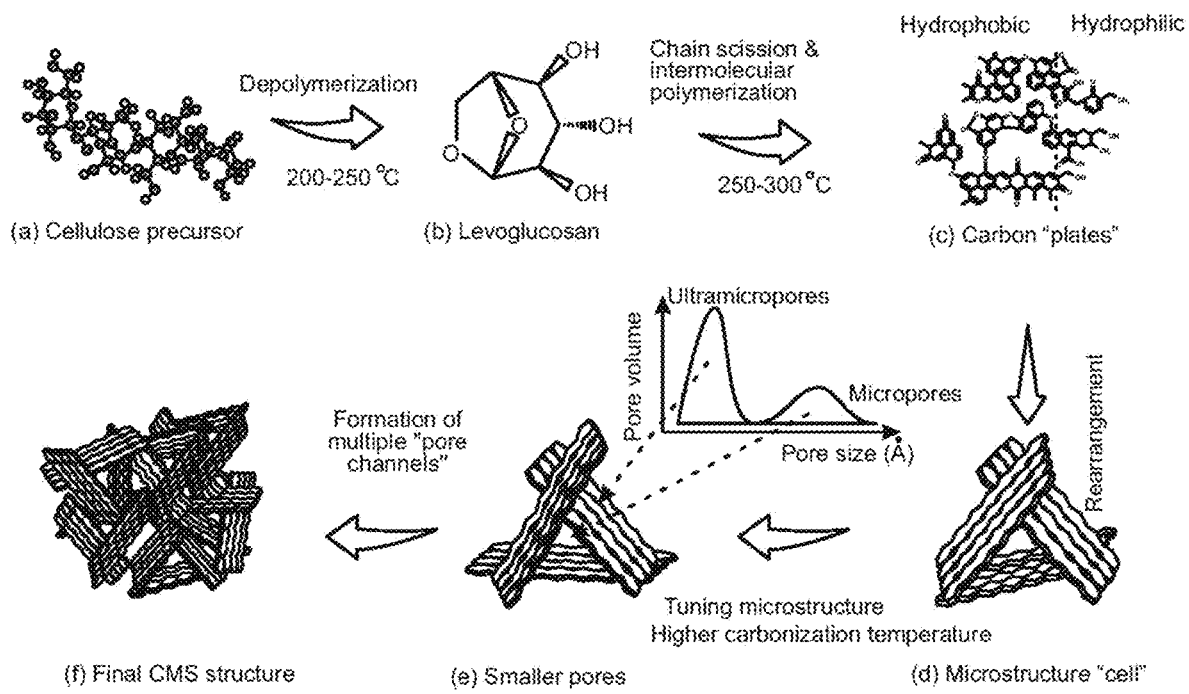

FIG. 5. The mechanism of transformation from cellulose precursors to amorphous carbon membranes with bimodal pore structure.

Figure 6:
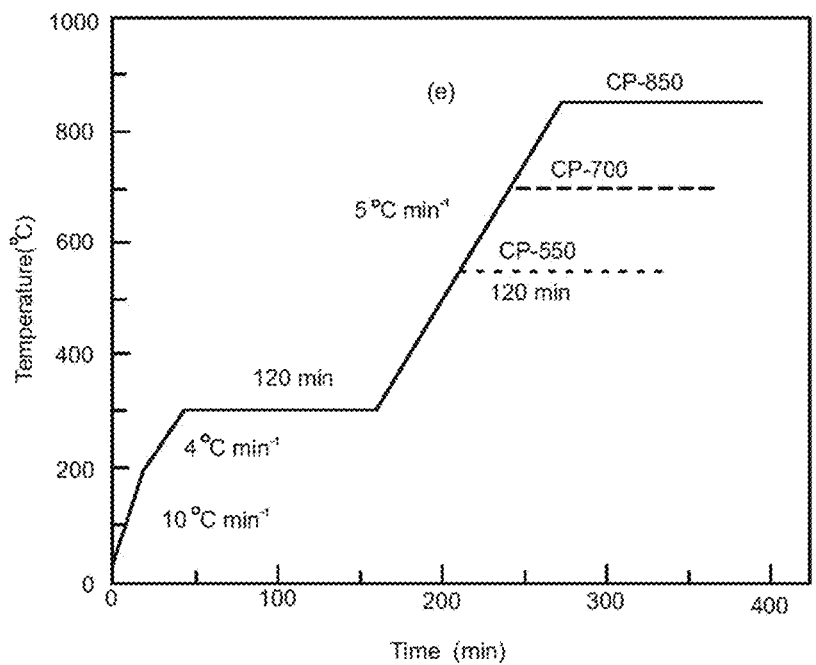

FIG. 6. Carbonization protocols for cellulose hollow fibre precursors.

Figure 7:
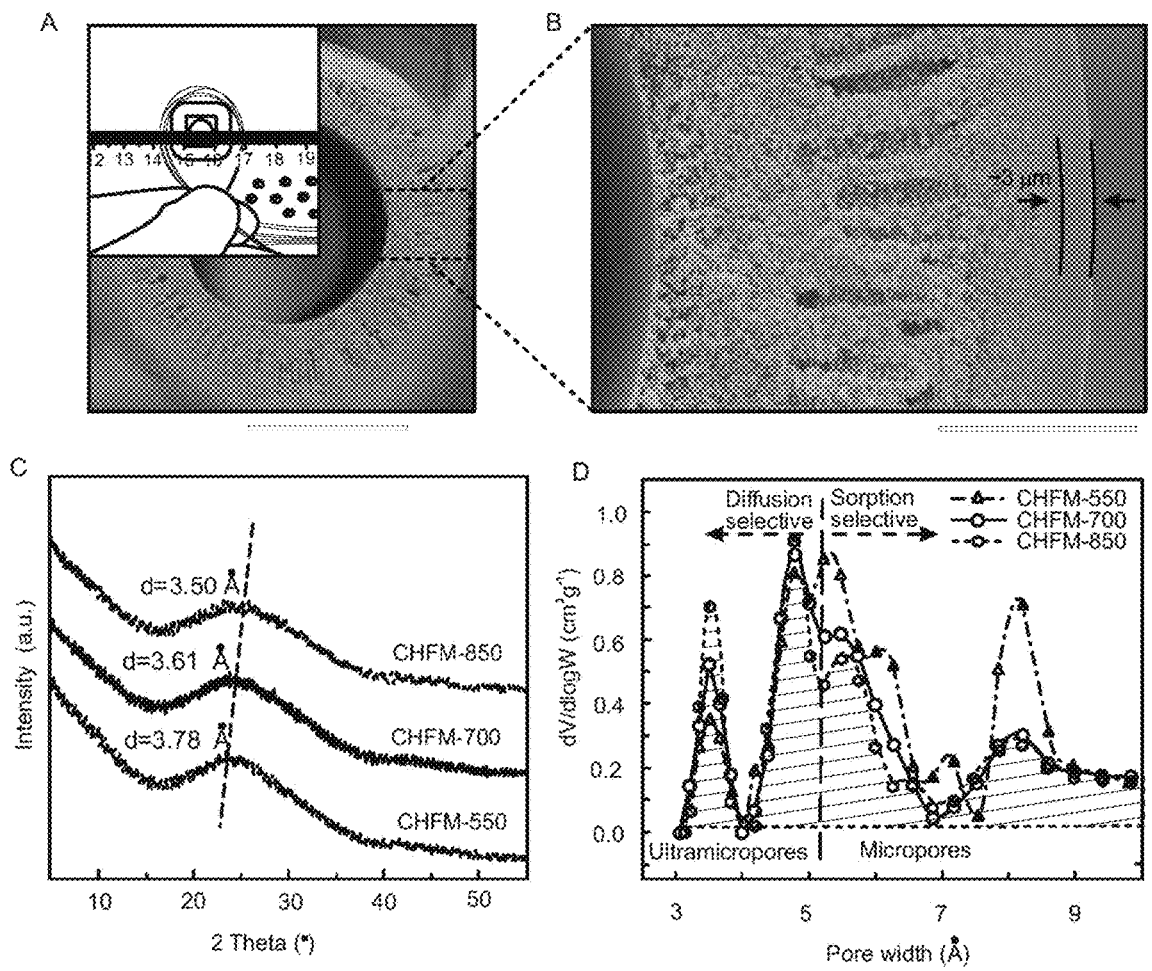

FIG. 7. A-B) Cross-sectional SEM images of CHFM-700; inset bent fibre. Scale bars: a-100 µm, b-20 µm; C) the XRD patterns of CHFMs carbonized at different temperatures; and D) the pore size distributions of CHFMs.

Figure 8:
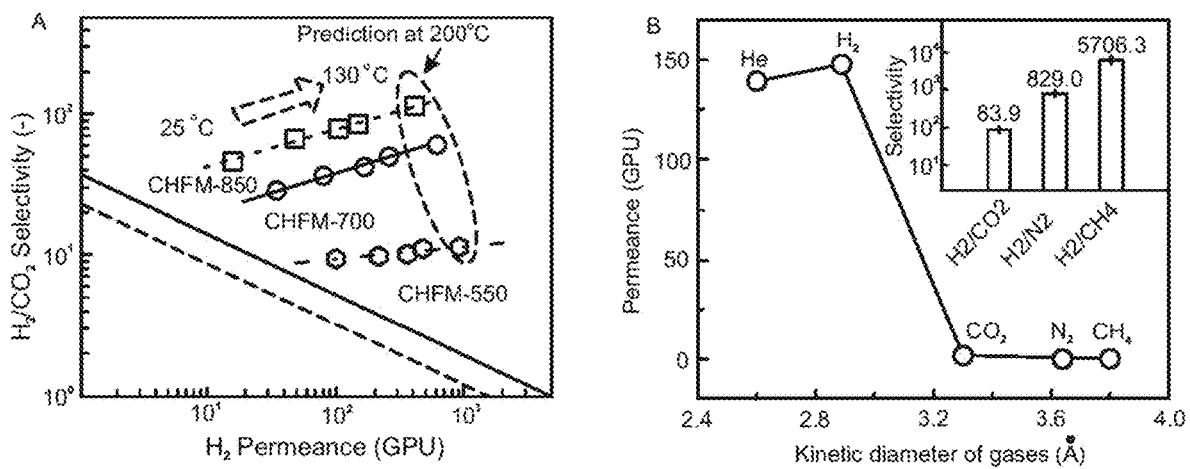

FIG. 8. A) Single gas performances of CHFMs. B) Single-gas permeances of CHFM-850 as a function of the gas kinetic diameter. Inset: selectivity of the membrane for $H_2$ over $CO_2$, $N_2$ and $CH_4$.

Figure 9:
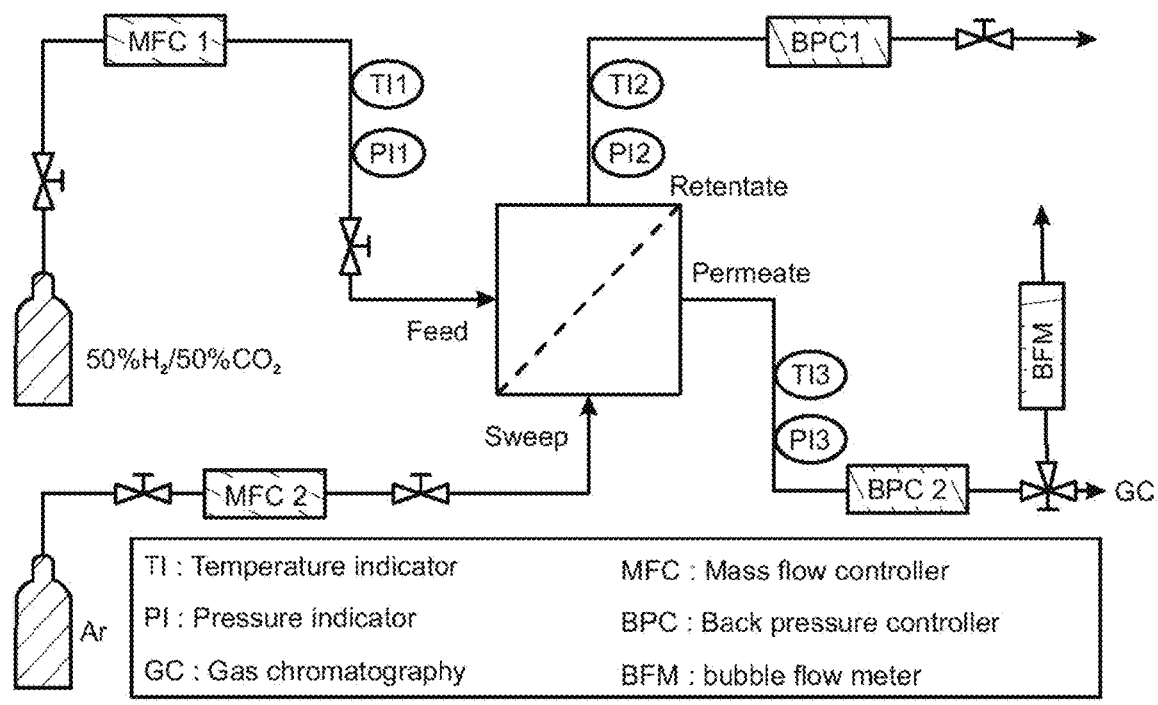

FIG. 9. Illustration of the high-pressure mixed gas permeation rig.

Figure 10:
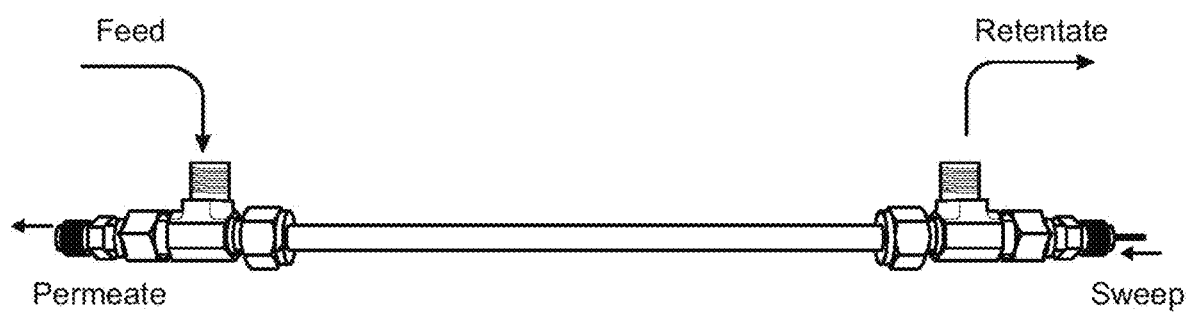

FIG. 10. Representative module used for mixed gas permeation measurements.

Figure 11:
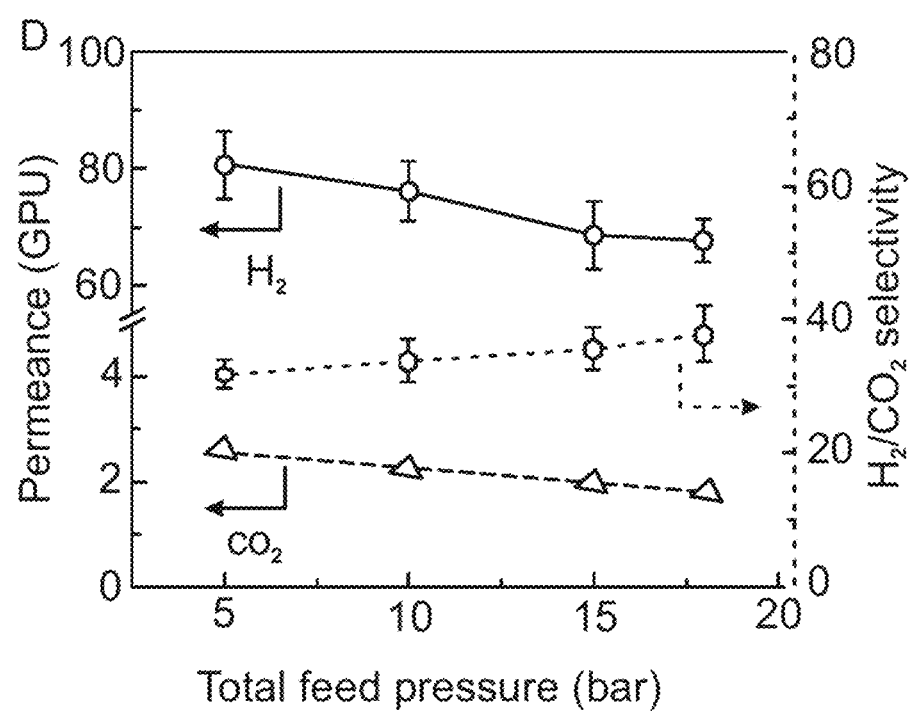

FIG. 11. 50 mol % $H_2$/50 mol % $CO_2$ mixed gas measurements of CHFM-700 at different operation pressures (5-18 bar) at 70° C.

EXAMPLES

Materials

Microcrystalline cellulose (MCC) powder (Avicel PH-101), isopropanol (≥99.7%, FCC grade), n-hexane (ReagentPlus®, ≥99%) and dimethyl sulfoxide (DMSO, FCC grade) were purchased from Sigma-Aldrich. 1-Ethyl-3-methylimidazolium acetate (EmimOAc, >95%) was purchased from IOLITEC GmbH. All chemicals were used as received. Single gas (e.g. $H_2$, $CO_2$) and 50 mol %-50 mol % $H_2/CO_2$ mixed gas were bought from AGA, Norway. All fittings used for the construction of membrane modules were purchased from Swagelok.

Characterization

SEM images were obtained using a Hitachi SU-6600 field emission scanning electron microscope (FESEM). XRD analysis of CHFMs was carried out by Bruker D8 Focus instrument operated at 45 kV and 200 mA with 2θ ranging from 5° to 70° at a scan speed of 0.05 s$^{-1}$ (Cu-Kα radiation, λ=0.154 nm). $CO_2$ physisorption was measured by Quantachrome® ASiQwin™ automated gas sorption analyser at 0° C. XPS spectra were obtained by ESCALAB 250 operated at 150 W and 200 eV with monochromatic Al-Kα radiation. Raman analysis was conducted using Renishaw inVia Raman Microscope with a 532 nm laser.

Example 1: Preparation of Asymmetric Cellulose Hollow Fibres

Figure 1:
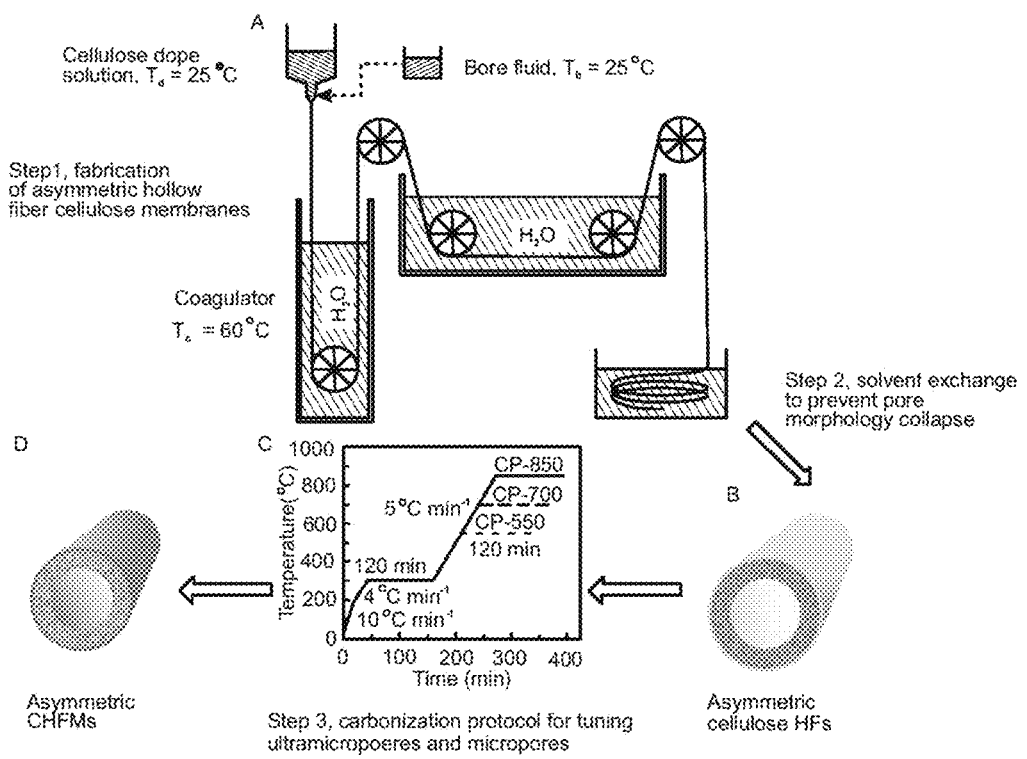
FIG. 1. A) Schematic of the fabrication process for asymmetric cellulose hollow fibres by the dry-wet spinning process; B) Schematic of dried cellulose hollow fibre precursors; C) Carbonization protocols for fabrication of CHFMs; D) Schematic of asymmetric CHFMs.

Asymmetric cellulose hollow fibres, which are precursors for the final carbonised CHFMs, were prepared by a dry-wet spinning process as illustrated in FIG. 1A. A 12 wt. % MCC/(EmimOAc+DMSO) dope solution was used in the spinning process. MCC (60 g) (Cellulose I) was gradually added into 440 g EmimOAc/DMSO (weight ratio 3:1) co-solvent with mechanical stirring in a $N_2$ atmosphere glovebox, and kept at 50° C. overnight, to allow the cellulose to be dissolved completely. Asymmetric cellulose (Cellulose II) hollow fibres were then fabricated by a dry-wet spinning process under the conditions given in Table 1.

TABLE 1

| Cellulose hollow fibre spinning conditions | |
|---|---|
| Spinning conditions | Value |
| Dope solution composition and temperature | 12% MCC in (75 wt. % EmimOAc + 25 wt. % DMSO), 25° C. |
| Bore fluid composition and temperature | 20% Water in (75 wt. % EmimOAc + 25 wt. % DMSO), 25° C. |
| First coagulation bath temperature | 60° C. |
| Second coagulation bath temperature | 40° C. |
| Dope flow rate | 4.4 mL min$^{-1}$ |
| Bore flow rate | 1.8 mL min$^{-1}$ |

TABLE 1-continued

| Cellulose hollow fibre spinning conditions | |
|---|---|
| Spinning conditions | Value |
| Take up speed | 14.6 m min$^{-1}$ |
| Air gap | 8 cm |
| Spinneret OD/ID | 0.7/0.5 mm |

The resulting spun hollow fibres were cut in ca 1.2 m long sections and placed in a deionized water bath over 48 h to fully exchange the solvent (EmimOAc+DMSO) with water. The water-wetted cellulose hollow fibres were immersed into pure isopropanol for 2 h, followed by soaking in n-hexane for 2 h, and then all the hollow fibres were allowed to dry under ambient conditions in air.

Cross-sectional SEM images of the resulting dried cellulose hollow fibres are shown in FIGS. 2A and 2B. The hollow fibres present a clear asymmetric structure, with a relatively dense outer layer, a middle layer rich in macrovoids, and a more porous inner support layer. This is in stark contrast to the structure of the comparative cellulose hollow fibre shown in FIGS. 3A and 3B, which was prepared according to the same method but with ambient air drying direct from the water-wetted fibres i.e. without the solvent exchange treatment. The cellulose hollow fibre of FIGS. 3A and 3B has a dense and symmetric structure, most likely as a result of pore collapse. The solvent exchange treatment is therefore critical in order to obtain cellulose hollow fibres that are asymmetric.

Example 2: Investigating the Effect of Coagulation Bath Temperature on Cellulose Hollow Fibre Structure In order to determine the optimal conditions for the formation of cellulose hollow fibres, the effect of the coagulation bath temperature (Ta) was investigated. To this end, different flat sheet membranes were cast under various T, conditions in the range of 25° C. to 60° C., whilst the dope temperature (Td) was maintained at 25° C. No bore fluid was used in the preparation of the flat sheet membranes. The water-wetted cellulose membranes were then immersed into pure isopropanol for 2 h, followed by soaking in n-hexane for 2 h, and then all the membranes were allowed to dry under ambient conditions in air.

Cross-sectional SEM images of the resulting flat sheet membranes are presented in FIG. 4 (A) 25° C., B) 35° C., C) 40° C., D) 45° C., E) 50° C. and F) 60° C.). The images show that a low coagulation bath temperature (T, =40° C. or less) gives rise to a cellulose membrane having a dense and symmetric structure (FIGS. 4A-C). In contrast, when T, 45° C., clear asymmetric structures having a dense top layer and a more porous support layer are generated (FIGS. 4D-F). In further tests, simply elevating the dope temperature whilst maintaining a coagulation bath temperature lower than 40° C. did not give rise to the desired asymmetric structure.

The temperature of the coagulation bath is therefore critical in obtaining cellulose hollow fibres having an asymmetric structure. Moreover, variation of the coagulation bath temperature is shown to allow for control over the relative thickness of the dense and porous layers.

Example 3: Preparation of Carbon Hollow Fibre Membranes

The dried cellulose hollow fibres prepared in Example 1 were carbonized in a tubular furnace (Horizontal Split Tube Furnace, Carbolite Gero Limited) by applying the specific carbonization protocols depicted in FIG. 6, under high purity argon (Ar, 99.999%) purge gas under a continuous flow of 80 mL min$^{-1}$. A dwell-time of 2 h at 300° C. was employed to take into account the significant weight loss at this temperature due to cellulose depolymerisation. Three types of carbon membranes were obtained at different final temperatures of 550, 700 and 850° C. (denoted as CHFM-550, CHFM-700, and CHFM-850 respectively) while all other carbonization parameters (e.g., heating rate, dwell time, etc.) were the same. The tubular furnace was evacuated down to ~3 mbar overnight before being purged with Ar. The system was cooled down naturally after the carbonization process was completed, and the resulting carbon hollow fibre membranes (CHFMs) were removed when the temperature had cooled to below 50° C.

Cross-sectional SEM images of CHFM-700 are presented in FIGS. 7A and 7B. The asymmetric structure of the hollow fibres was well maintained with an outer selective layer of ca. 3 μm and an integral porous inner support layer. The prepared CHFMs also exhibit good mechanical flexibility with a bend radius of <1.5 cm, as indicated in the inset of FIG. 7A.

The XRD patterns for these CHFMs are shown in FIG. 7C. The patterns reveal the characteristic peak for 2θ at around 24°, which corresponds to the (002) plane of the graphite phase (sp$^2$ carbon). The d-space was calculated from the Bragg equation. The peak shift to a higher 2θ indicates that the average inter-plane distance ($d_{002}$) decreases from 3.78 Å to 3.50 Å when the carbonization temperature increases from 550 to 850° C. This indicates that the carbon membranes prepared at higher carbonization temperatures tend to form graphitic carbon (~3.4 Å) with a more ordered graphitic structure and smaller pores.

The pore size distribution shown in FIG. 7D, calculated by the NLDFT model from $CO_2$ physisorption at 0° C. in the range of 3-10 Å, confirms the narrowing of the pore width of CHFM-850 compared to CHFM-550. The present CHFMs exhibit a strong peak for the ultramicropores in the range of 3-4 Å, which is in the size range needed to allow molecular sieving between $H_2$ (2.9 Å) and other larger gas molecules (e.g., $CO_2$, $N_2$, and $CH_4$). With the increase of the carbonization temperature, the micropore peaks (>5 Å) are weakened, while that of the ultramicropores (<5 Å) increases, which indicates that the average pore size decreases for the CHFMs carbonized at higher temperatures.

The CHFMs were characterized by XPS, and the elemental compositions of different carbon membranes are given in Table 2. The carbon content increases with the increase of carbonization temperature.

TABLE 2

Elemental composition of the CHFMs from XPS analysis.

| | C (at. %) | O (at. %) | N (at. %) |
|---|---|---|---|
| CHFM-550 | 90.08 | 9.26 | 0.67 |
| CHFM-700 | 91.25 | 8.10 | 0.65 |
| CHFM-850 | 92.41 | 7.04 | 0.55 |

In order to establish the suitability for gas separation, single and mixed gas permeation experiments were performed on the CHFMs prepared in Example 3. Single gas permeation measurements were conducted by applying a constant permeate volume method using a feed pressure of 2 bar. The gas permeance and selectivity are calculated using eq. (1):

$$\frac{P}{l} = \frac{273.15 \cdot 10^3 V}{76 T \cdot A} \cdot \frac{\int_{p_1}^{p_2} \frac{dp}{P_F - p}}{\Delta t} \quad (1)$$

where P/l (GPU, 1 GPU=1×10$^{-6}$ cm$^3$(STP)·cm$^{-2}$·s$^{-1}$·cm Hg$^{-1}$=3.35×10$^{-10}$ mol·s$^{-1}$·m$^{-2}$·Pa$^{-1}$) is the single gas permeance. V (cm$^3$) is the downstream (permeate) volume (predetermined using He calibration), and T(K) is the experimental temperature. A (cm$^2$) is the hollow fibre membrane outer active surface area (shell-side feed). $P_F$ and p (bar) are the pressures in the feed side and permeate side, respectively. Δt (s) is the steady state testing time. The $H_2/CO_2$ ideal selectivity is calculated by the ratio of $H_2$ permeance to $CO_2$ permeance.

FIG. 8A shows the single gas performances of the CHFMs prepared in Example 3 at 25° C., 60° C., 100° C. and 130° C. with 2 bar feed pressure. Hollow symbols represent predicted performance at 200° C. The membranes prepared at higher carbonization temperatures provide higher $H_2/CO_2$ selectivity, but with the sacrifice of some $H_2$ permeance. For instance, CHFM-850 has a $H_2/CO_2$ selectivity of 46.2 at 25° C., which is ~4 times higher than that of CHFM-550, while $H_2$ permeance is decreased from 102.1 GPU to 16.2 GPU concomitantly. The solid and dashed lines drawn in a) are based on the 2008 Robeson upper bound line by converting permeability to permeance, assuming a membrane selective layer thickness of 1 and 3 μm, respectively.

FIG. 8B shows the single-gas permeances of CHFM-850 as a function of the gas kinetic diameter at 130° C. and 2 bar. There is a clear cut-off of gas permeance between the smaller molecules (148.2 GPU for $H_2$ and 139.6 GPU for He) and that of the larger molecules, which indicates that gas permeation is dominated mainly by kinetic diameter of the gas molecules, i.e. using a molecular sieving transport mechanism. The inset figure shows the selectivity of $H_2$ over $CO_2$, $N_2$ and $CH_4$.

Gas permeance and selectivity vary significantly with temperature. Significant increases of gas permeance and selectivity are observed by increasing the temperature from 25 to 130° C. (FIG. 8A), particularly for the membranes prepared at higher carbonization temperatures. At 130° C., the $H_2/CO_2$ selectivity and $H_2$ permeance of the CHFM-850 increased to 83.9 and 148.2 GPU, respectively, which are approximately 2 times and 9 times higher than the results obtained at a temperature of 25° C. Higher temperatures accelerate gas diffusion, which enhances gas permeation. Conversely, the lower $CO_2$ adsorption at higher temperatures improves the $H_2/CO_2$ selectivity. Therefore, considering practical industrial applications, for example, $H_2$ purification from natural gas-derived syngas (which is usually operated at 150° C. or above), a higher operating temperature is preferable to enhance the $H_2/CO_2$ separation performance.

To test the potential of CHFMs for $H_2$ purification in a steam methane reforming process (usually performed at pressures of up to 15-20 bar), a lab-scale hollow fiber module containing CHFM-700 was tested using a 50/50 mol. % $H_2/CO_2$ mixed gas at 70° C. at different feed pressures (5-18 bar) using a high-pressure gas permeation rig (FIGS. 9 and 10). All the tube lines and the membrane module were pre-heated to a set temperature during gas permeation testing. The feed flow is controlled at 150 NmL min$^{-1}$ during the testing. Argon was used as sweep gas. The permeate gas flow and composition were measured by a bubble flow meter and a gas chromatograph (GC, 8610C, SRI Instruments Inc.), respectively. Three CHFM-700 membrane modules (8 carbon hollow fibres per module) were tested to determine experimental error. Gas was fed to the shell side, and the permeate gas exited from the bore side, with argon as sweep gas operated in a counter-current flow pattern. The selectivity is calculated by $$\alpha = \frac{y_{H_2}/y_{CO_2}}{x_{H_2}/x_{CO_2}},$$

where $y_i$ and $x_i$ are the concentration of the components in the permeate and feed, respectively.

The results of the mixed gas test are shown in FIG. 11. There is a gradual decrease in $H_2$ permeance (ca. 15.8%) with an increase in the total feed pressure from 5 to 18 bar, but the $H_2/CO_2$ selectivity increases from 31.8 to 37.7 (18.6% increase). The CHFMs according to the present invention are thus particularly suited for high pressure gas separation conditions, such as in the steam-methane reforming reaction.

The invention claimed is:

1. A process for the production of an asymmetric cellulose hollow fibre comprising the steps of:
   a) providing a dope solution comprising cellulose, at least one ionic liquid, and optionally one or more co-solvent (s);
   b) coextruding into a gaseous atmosphere: said dope solution and a bore fluid comprising water, at least one ionic liquid, and optionally one or more co-solvent(s);
   c) quenching the coextruded dope solution and bore fluid in at least one coagulation bath containing water to form a water-wetted fibre, wherein the temperature of the coagulation bath is greater than 40° C.;
   d) contacting said water-wetted fibre with at least one organic solvent having a surface tension lower than that of water; and optionally
   e) drying the fibre.

2. The process according to claim 1 wherein the cellulose in the dope solution is microcrystalline cellulose (MCC).

3. The process according to claim 1 wherein the amount of cellulose in the dope solution is 1.0 to 25.0 wt. %.

4. The process according to claim 1 wherein the ionic liquid of the dope solution and/or the bore fluid comprises 1-ethyl-3-methylimidazolium.

5. The process according to claim 1 wherein the co-solvent is a polar solvent.

6. The process according to claim 1 wherein the temperature of the coagulation bath is in the range of 41° C. to 80° C.

7. The process according to claim 1 wherein the organic solvent having a surface tension lower than that of water is selected from the group consisting of C1-C6 alcohols, C5-C8 linear or branched aliphatic hydrocarbons, or mixtures thereof.

8. The process according to claim 1 wherein step d) comprises contacting the water-wetted fibres sequentially with at least two different organic solvents having a surface tension lower than that of water.

9. An asymmetric cellulose hollow fibre produced by the process according to claim 1; wherein the asymmetric cellulose hollow fibre consists essentially of cellulose II.

10. A process for the production of an asymmetric carbon hollow fibre membrane (CHFM) comprising the steps of:
    a) providing an asymmetric cellulose hollow fibre produced by the process according to claim 1; and
    b) pyrolysing said asymmetric cellulose hollow fibre.

11. The process according to claim 10 wherein the asymmetric cellulose hollow fibre is pyrolysed directly.

12. A process according to claim 10, wherein the pyrolysis step b) involves heating the asymmetric cellulose hollow fibre to a temperature of at least 500° C.

13. An asymmetric carbon hollow fibre membrane (CHFM) produced by a process according to claim 10.

14. An asymmetric carbon hollow fibre membrane (CHFM) having a dense outer layer and a concentric porous inner layer, wherein the asymmetric carbon hollow fibre membrane comprises at least 85 atomic % carbon, 5 to 15 atomic % oxygen and up to 1.0 atomic % nitrogen.

15. The asymmetric CHFM as claimed in claim 14 having a silicon content determined by X-ray photoelectron spectroscopy (XPS) of less than 1.0 atomic %.

16. The asymmetric CHFM as claimed in claim 14 having an $H_2$ permeance of at least 140 GPU and an $H_2/CO_2$ selectivity of at least 10.0 at 130° C. and a pressure of 2 bar.

17. A module comprising a plurality of CHFMs as claimed in claim 14.

18. The process according to claim 1, wherein the ionic liquid comprises 1-ethyl-3-methylimidazolium acetate, 1-ethyl-3-methylimidazolium chloride, 1-ethyl-3-methylimidazolium dicyanamide, 1-ethyl-3-methylimidazolium diethyl phosphate, 1-ethyl-3-methylimidazolium dimethyl phosphate or 1-butyl-3,5-dimethylpyridinium bromide.

19. The process according to claim 1, wherein the co-solvent is an aprotic polar solvent.

20. The process according to claim 1 wherein the organic solvent is selected from the group consisting of isopropanol, n-hexane, and mixtures thereof.

21. The process according to claim 1, wherein the at least one organic solvent of step d) comprises a first solvent selected from the group consisting of C1-C6 alcohols and a second solvent selected from the group consisting of C5-C8 linear or branched aliphatic hydrocarbons, wherein step d) comprises a first contacting step with the first solvent followed by a second contacting step with the second solvent.

* * * * *